United States Patent Office 2,948,746
Patented Aug. 9, 1960

2,948,746
BASIC ESTERS OF α-ALKYL PHENOL ACETIC ACIDS AND DERIVATIVES THEREOF, AND A PROCESS OF MAKING SAME

Werner Stuehmer, Eldagsen, near Hannover, and Siegfried Funke, Hannover, Germany, assignors to Kali-Chemie Aktiengesellschaft, Hannover, Germany, a stock company of Germany No Drawing. Filed July 14, 1954, Ser. No. 443,442
Claims priority, application Germany July 15, 1953

6 Claims. (Cl. 260—477)

The present invention relates to new spasmolytic compounds and more particularly to new spasmolytically effective basic esters of diastereomeric α-alkyl phenyl acetic acids and their derivatives, and to a process of making same.

It is known that basic esters of alkyl phenyl acetic acids containing one asymmetric carbon atom and an alkyl radical with 2 to 7 carbon atoms, have spasmolytic properties. Such compounds are characterized by the presence of an asymmetric carbon atom in their molecule. The best known and most effective compound of this series of compounds is the β-diethylamino ethyl ester of α-n-propyl phenyl acetic acid of the following Formula I

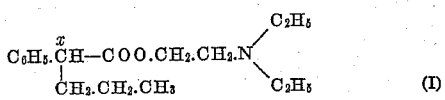

$x$ in said formula indicates the asymmetric carbon atom. Said β-diethylamino ethyl ester of α-n-propyl phenyl acetic acid has a high musculotropic activity and a lower neurotropic activity. In contrast thereto the higher homologues of said compound wherein the n-propyl side chain is replaced by the isoamyl and the heptyl radical do not exhibit any spasmolytic activity against spasms caused by barium chloride. At the same time their spasmolytic action against spasms caused by carbaminoyl choline chloride, known to the trade as "Doryl" or "Lentin," is of such a low order that said homologues are useless for all practical purposes. Said higher homologues correspond to the following Formula II

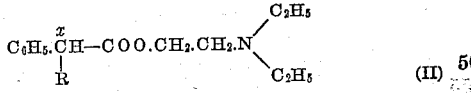

wherein R is an isoamyl or a heptyl radical.

It is one object of the present invention to provide new and valuable basic esters of α-alkyl phenyl acetic acids which, in contrast to said known esters, have a surprisingly high spasmolytic activity and which, in their spasmolytic activity, surpass the heretofore known compounds of the α-alkyl phenyl acetic acid series.

Another object of the present invention is to provide new and valuable quaternary ammonium compounds of said new basic esters of α-alkyl phenyl acetic acids which compounds also possess a surprisingly high spasmolytic activity in neurotropic as well as musculotropic respect.

A further object of the present invention is to provide a simple and effective process of producing such new basic esters of α-alkyl phenyl acetic acids and their quaternary ammonium compounds.

Other objects of the present invention and advantageous features thereof will become apparent as the description proceeds.

The new compounds are characterized and differ from the known compounds by the presence of a second asymmetric carbon atom in the α-alkyl group of their molecule. They correspond to the following general Formula III:

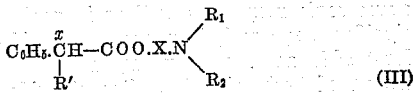

In said formula $x$ indicates an asymmetric carbon atom, R′ is an alkyl radical with an asymmetric carbon atom, said radical having 4 to 8 carbon atoms, X is a lower alkylene radical or a lower alkylene oxy-alkylene radical, and $R_1$ and $R_2$ are lower alkyl radicals or together with the nitrogen atom a five- or six-membered heterocyclic radical. Especially valuable compounds of this type are characterized by the following substituents X; R′; $R_1$ and $R_2$:

A

Compounds wherein X is —CH₂.CH₂—:

Formula IV: 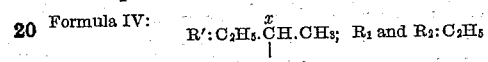

Formula V: 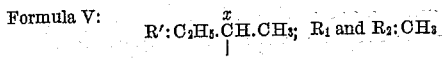

Formula VI: 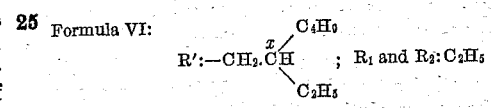

Formula VII: 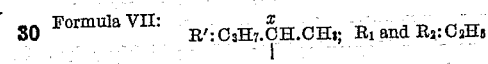

Formula VIII: 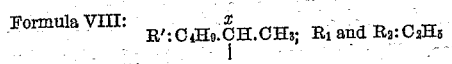

Formula IX: 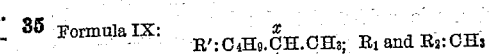

Formula X: 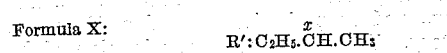

Formula XI: 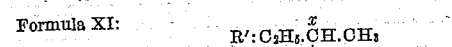

B

Compounds wherein X is another radical than the ethylene radical are characterized, for instance, by the following substituents for X; R′; $R_1$ and $R_2$:

Formula XII: 

Formula XIII: 

Formula XIV: 
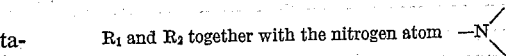

Other compounds of this series corresponding to the above given Formula III are, of course, also suitable for the purpose of this invention.

Of said compounds, α-1-methyl propyl phenyl acetic acid-β-diethylamino ethyl ester, in the form of its acid addition compound with citric acid, said compound corresponding to the above given Formula IV, exhibits, in neurotropic respect as well as in musculotropic respect, significant spasmolytic properties. Said compound is at least 30% more effective against spasms caused by the action of carbaminoyl choline chloride on the isolated guinea pig uterus, than the isomeric α-n-butyl phenyl acetic acid-β-diethylamino ethyl ester having the same number of carbon atoms in the α-alkyl group but only one asymmetric carbon atom.

α-1-methyl propyl phenyl acetic acid-β-diethylamino ethyl ester is also at least 30% more effective than α-n-propyl phenyl acetic acid-β-diethylamino ethyl ester of Formula I which is regarded as the most effective compound of this series of compounds. It has a considerably lower toxicity than said compound of Formula I and, therefore, its range of therapeutic usefulness is much greater. Its L.D.$_{50}$ is 67.6 mg./kg. on intravenous administration to mice while the L.D.$_{50}$ of Compound I is 40 mg./kg., also intravenously administered to mice. Furthermore, it is very surprising that said new compound is readily soluble in water, has an excellent compatibility to the tissue, and that its spasmolytic effect sets in very rapidly. Therefore, it is especially adapted for making injectable therapeutic preparations.

The hydrochloride of α-1-methyl propyl phenyl acetic acid piperidino ethyl ester of Formula X has even a considerably higher spasmolytic activity than the compound of Formula IV. Likewise, the compounds corresponding to the above given Formulas V to IX are highly effective musculotropic and neurotropic spasmolytic agents.

The new compounds have proved to be of great value in clinical use. For instance, the citrate of α-1-methyl propyl phenyl acetic acid-β-diethylamino ethyl ester of Formula IV has been employed therapeutically in the form of ampoules preferably containing 25 mg./cc., tablets of 50 mg., and suppositories containing 50 mg. in each suppository. The ampoules were administered by injection against colic of the gall bladder and kidneys, and gastro-intestinal spasms.

To give an effective dosage requires 1 to 2 ampoules per day. The tablets are used for the same indications and also in the treatment of ulcus ventriculi or duodeni. Good results were achieved by administering one tablet of 50 mg. twice or three times daily. Suppositories may also be administered in a dosage of 1 to 3 suppositories per day. All three forms of administration have given fully satisfactory clinical results.

New and valuable compounds with excellent spasmolytic properties in neurotropic as well as musculotropic respect are obtained by converting said basic esters of α-alkyl phenyl acetic acid of the above given Formula III into the corresponding quaternary ammonium compounds. For instance, α-1-methyl propyl phenyl acetic acid-β-diethylamino ethyl ester bromo methylate is far superior to atropine with respect to the speed with which the spasmolytic action sets in and with respect to its reliability, when tested on dog's intestines in situ. Said quaternary ammonium compound is also considerably more effective than papaverine when tested on guinea pig's intestines in situ. Furthermore, said compound exhibits a pronounced gangioplegic action. Such an action is not exerted, for instance, by α-n-propyl phenyl acetic acid-β-diethylamino ethyl ester of Formula I. The absence of undesirable side effects upon circulation and saliva secretion represents a further very remarkable advantage of said new compound.

α-1-methyl propyl phenyl acetic acid-β-diethylamino ethyla ester bromo methylate has been clinically administered in the form of ampoules preferably containing 4 mg./ccm., of dragees containing 5 mg. per dragee, and of suppositories with 5 mg. per suppository. The ampoules are used in the therapy of colics of the gall bladder and kidneys and of gastro-intestinal spasms. 1 to 2 ampoules per day represent a preferred dosage. The dragees are given for the same indications and in the therapy of ulcus ventriculi or duodeni. A satisfactory dosage requires, three to five times daily one dragee. Side effects were not observed. In all clinical cases fully satisfactory results were achieved.

The new spasmolytic agents are preferably produced by esterifying diastereomeric α-alkyl phenyl acetic acids with the corresponding amino alcohols. The resulting esters can readily be distilled and purified. Readily water soluble derivatives are obtained therefrom by means of citric acid by crystallization from acetone.

The starting materials, the diastereomeric α-alkyl phenyl acetic acids, are preferably prepared by alkylation of benzylcyanide in benzene solution with alkyl halogenides in the presence of sodium amide, and by saponifying the resulting nitriles to the corresponding acids. Said acids are preferably converted into the corresponding acid halogenides and then esterified with the corresponding amino alcohols to yield the new basic esters.

The new quaternary ammonium compounds are readily obtained, for instance, by the action of alkyl halogenides upon the above mentioned amino esters. The corresponding bromo methylate is, for instance, produced by reacting methyl bromide upon α-1-methyl propyl phenyl acetic acid-β-diethylamino ethyl ester of Formula IV. The resulting quaternary ammonium compounds are, in general, readily crystallizable, stable on exposure to air, and very readily soluble in water. Their high water solubility renders said compounds especially suitable as injectable preparations.

The following examples serve to illustrate the present invention without, however, limiting the same thereto.

EXAMPLE 1

(a) α-1-methyl-n-propyl phenyl acetonitrile

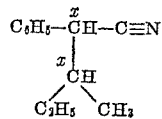

50 g. of sodium amide in 400 cc. of dry benzene are brought into solution with 117 g. of benzylcyanide while moderately heating. 140 g. of 2-bromo butane are added drop by drop to said solution. The reaction mixture is heated to boiling for 2½ hours and is then cooled and decomposed by the addition of ice water. The benzene layer is separated, washed with water, and dried over sodium sulfate. The solvent is distilled off. The residue distills at 130–133° C./12 mm. Yield: 100 g.

In place of benzene, there can be used other organic inert solvents, such as toluene, xylene, ether and the like. Absence of water during the reaction is of great importance to achieve satisfactory yields.

By proceeding in the same manner as described above and using other alkyl bromides or other alkyl halogenides in place of 2-bromo butane, there are obtained the following nitriles:

| Alkyl bromide | Resulting phenyl acetonitrile | Boiling point, °C. | mm. Hg. |
|---|---|---|---|
| 1-Bromo-2-ethyl hexane | α-2-ethyl-n-hexyl phenyl acetonitrile | 175–178 | 12 |
| 2-Bromo pentane | α-1-methyl-n-butyl phenyl acetonitrile | 143–153 | 12 |
| 2-Bromo hexane | α-1-methyl-n-pentyl phenyl acetonitrile | 151–155 | 8 |

(b) α-1-methyl-n-propyl phenyl actice acid

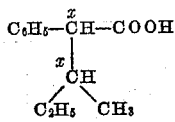

80 g. of α-1-methyl propyl phenyl acetonitrile are heated to boiling in 320 cc. of concentrated sulfuric acid and 320 cc. of water for 5 hours while stirring. After cooling, the precipitated oil is dissolved in aqueous 40% sodium hydroxide solution and the resulting solution is filtered. The alkaline solution is extracted by shaking with ether and is acidified by the addition of concentrated hydrochloric acid. The precipitated oil is dissolved in ether and the ethereal solution is dried over sodium sulfate. The ether is distilled off and the oily residue is purified by distillation in a vacuum. Its boiling point is 171–179° C./17 mm. Yield: 66 g.

It is, of course, possible to use sulfuric acid of higher or lower concentration for the hydrolysis of the nitrile. The above mentioned mixture of concentrated sulfuric acid and water in the proportion 1:1, however, has proved to be the preferred one. Alkali hydroxide solutions of any desired concentration may also be used. Preferably a comparatively concentrated alkali hydroxide solution is employed. Since alkaline hydrolysis yields the acid only as a by-product while the main hydrolysis product is the corresponding amide, sulfuric acid is the preferred hydrolyzing agent.

By proceeding according to the above described procedure and using as starting materials other α-alkyl phenyl acetonitriles, the following α-alkyl phenyl acetic acids are obtained:

| Nitrile used | Resulting acid | Boiling point |
| --- | --- | --- |
| α-1-Methyl butyl phenyl acetonitrile. | α-1-methyl-n-butyl phenyl acetic acid. | 166° C./2 mm. |
| α-1-Methyl pentyl phenyl acetonitrile. | α-1-methyl-n-pentyl phenyl acetic acid. | 173–185° C./2 mm. |

It is, of course, also possible to first produce the acid amide and then convert said acid amide into the acid as is illustrated by the following example:

α-2-ethyl-n-hexyl phenyl aectic acid

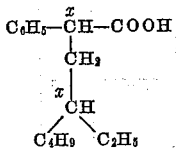

44.2 g. of a α-2-ethyl-n-hexyl phenyl acetonitrile are heated to boiling with 120 cc. of concentrated sulfuric acid and 112 cc. of water for 5 hours while stirring. The reaction mixture is then cooled and the precipitated solid residue is dissolved in ether. The ethereal solution is shaken with aqueous sodium hydroxide solution and the alkaline solution is separated from the ether. The ethereal solution is dried over sodium sulfate and the ether is evaporated in a vacuum yielding crude α-2-ethyl-n-hexyl phenyl acetic acid amide as residue.

40 g. of said crude amide are dissolved in 400 g. of concentrated sulfuric acid. A solution of 45 g. of sodium nitrite in 45 cc. of water is gradually added thereto and the resulting reaction mixture is gently heated on a water bath until evolution of nitrogen ceases. The mixture is then diluted with water, extracted with ether, and the ethereal solution is thoroughly extracted with aqueous 10% sodium hydroxide solution. The alkaline solution is acidified with concentrated hydrochloric acid, the precipitated oil is dissolved in ether, and the ethereal solution is dried over sodium sulfate. The ether is distilled off and the remaining oily residue is purified by distillation in a vacuum. Its boiling point is: 204–214° C./4 mm. Yield: 20 g.

(c) α-1-methyl-n-propyl phenyl acetic acid chloride

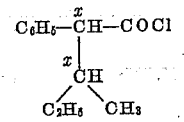

46 g. of α-1-methyl-n-propyl phenyl acetic acid are dissolved in 100 cc. of thionylchloride and the solution is heated to boiling for ½ hours. Excess of thionylchloride is then distilled off in a vacuum. The remaining acid chloride boils at 93–100° C./2 mm. Yield: 41.8 g.

In an analogous manner there are produced by proceeding according to the above given examples and using other α-alkyl phenyl acetic acids as starting materials, the following acid chlorides:

| Acid chloride of— | Boiling point |
| --- | --- |
| α-2-ethyl-n-hexyl phenyl acetic acid | 150–154° C./1 mm. |
| α-1-methyl-n-butyl phenyl acetic acid | 112–115° C./1 mm. |
| α-1-methyl-n-pentyl phenyl acetic acid | 130–134° C./3 mm. |

(d) α-1-methyl-n-propyl phenyl acetic acid-β-diethylamino ethyl ester and its citric acid addition compound

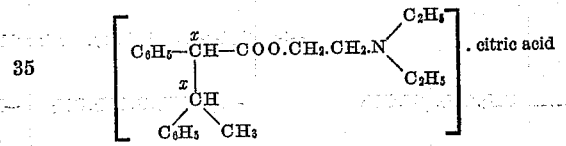

11.7 g. of β-diethyl amino ethanol are dissolved in 50 cc. of pyridine. 21 g. of α-1-methyl-n-propyl phenyl acetylchloride are added drop by drop to said solution while cooling. The mixture is heated to boiling under reflux for 8 hours and is then cooled. 600 cc. of ice water are added thereto and the resulting mixture is extracted with ether. The ethereal solution is dried over sodium sulfate, the ether is distilled off, and the oily residue is purified by distillation in a vacuum. The resulting base has a boiling point of 162° C./4 mm. Yield: 12.2 g.

The base is dissolved in ether and an ethereal solution of citric acid is added to said solution. The readily water soluble citrate precipitates. Its melting point, after recrystallization from acetone, is 116–118° C.

The hydrochloride of said base melts at 101–103° C.

Other salts with inorganic acids, such as the sulfate, phosphate, nitrate, hydrobromide, hydroiodide, or with organic acids, such as the formate, acetate, propionate, benzoate, salicylate, maleate, malonate, succinate, tartrate, adipinate and others can also be produced. Of course, for therapeutical purposes only such acid addition compounds are used, the acid component of which is compatible or inert to the human body.

When proceeding according to Example 1(d) and using, in place of α-1-methyl-n-propyl phenyl acetylchloride, other α-alkyl phenyl acetylchlorides and, in place of diethylamino ethanol, other amino alkanol compounds, other basic esters of α-alkyl phenyl acetic acid and their acid addition compounds are obtained as they are given in the following table. Said basic esters correspond to the following formula

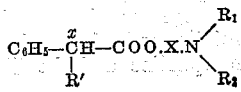

wherein R′, X, and $R_1$ and $R_2$ represent the same substituents as given hereinbefore:

| Example No. | R′ | X | $N\begin{smallmatrix}R_1\\R_2\end{smallmatrix}$ | Boiling point, °C. | mm. | Melting point, °C. (of citrate) |
|---|---|---|---|---|---|---|
| 2 | $CH_3.CH_2.\overset{x}{C}H.CH_3$ | $-CH_2.CH_2-$ | $-N\begin{smallmatrix}CH_3\\CH_3\end{smallmatrix}$ | 158 | 5 | 74-76 |
| | α-1-methyl-n-propyl phenyl acetic acid dimethylamino ethyl ester | | | | | |
| 3 | $-CH_2.\overset{x}{C}H\begin{smallmatrix}C_4H_9\\C_2H_5\end{smallmatrix}$ | $-CH_2.CH_2-$ | $-N\begin{smallmatrix}C_2H_5\\C_2H_5\end{smallmatrix}$ | 197-200 | 6 | 96-97 |
| | α-2-ethyl-n-hexyl phenyl acetic acid diethylamino ethyl ester | | | | | |
| 4 | $CH_3.CH_2.CH_2.\overset{x}{C}H.CH_3$ | $-CH_2.CH_2-$ | $-N\begin{smallmatrix}C_2H_5\\C_2H_5\end{smallmatrix}$ | 170-171 | 2 | 103-105 |
| | α-1-methyl-n-butyl phenyl acetic acid diethylamino ethyl ester | | | | | |
| 5 | $CH_3.CH_2.CH_2.CH_2.\overset{x}{C}H.CH_3$ | $-CH_2.CH_2-$ | $-N\begin{smallmatrix}C_2H_5\\C_2H_5\end{smallmatrix}$ | 193-198 | 10 | 96-97 |
| | α-1-methyl-n-pentyl phenyl acetic acid diethylamino ethyl ester | | | | | |
| 6 | $CH_3.CH_2CH_2CH_2.\overset{x}{C}H.CH_3$ | $-CH_2.CH_2-$ | $-N\begin{smallmatrix}CH_3\\CH_3\end{smallmatrix}$ | 184-186 | 13 | 67-70 |
| | α-1-methyl-n-pentyl phenyl acetic acid diethylamino ethyl ester | | | | | |
| 7 | $CH_3.CH_2.\overset{x}{C}H.CH_3$ | $-CH_2CH_2.O.CH_2.CH_2$ | $-N\begin{smallmatrix}C_2H_5\\C_2H_5\end{smallmatrix}$ | 188-192 | 5 | 84-85 |
| | α-1-methyl-n-propyl phenyl acetic acid diethylamino ethylene oxyethyl ester | | | | | |
| 8 | $CH_3.CH_2.\overset{x}{C}H.CH_3$ | $-CH_2.CH_2-$ | $-N\begin{smallmatrix}CH_2-CH_2\\CH_2-CH_2\end{smallmatrix}CH_2$ | 185-188 | 4 | 125-127 (HCl) |
| | α-1-methyl-n-propyl phenyl acetic acid-N-piperidino ethyl ester | | | | | |
| 9 | $CH_3.CH_2.\overset{x}{C}H.CH_3$ | $-CH_2.CH_2.CH_2-$ | $-N\begin{smallmatrix}CH_2-CH_2\\CH_2-CH_2\end{smallmatrix}CH_2$ | 205-222 | 3 | 140-142 (HCl) |
| | α-1-methyl-n-propyl phenyl acetic acid-N-piperidino-n-propyl ester | | | | | |
| 10 | $CH_3.CH_2.\overset{x}{C}H.CH_3$ | $-CH_2.CH_2-$ | $-N\begin{smallmatrix}CH_2-CH_2\\CH_2-CH_2\end{smallmatrix}$ | 175-176 | 5 | 83-85 |
| | α-1-methyl-n-propyl phenyl acetic acid-N-pyrrolidino ethyl ester | | | | | |

Of course, other basic esters of α-alkyl phenyl acetic acids may be produced according to the present invention. Thus, for instance, the alkyl radical R′ having an asymmetric carbon atom may be a 1-ethyl-n-butyl, 1-ethyl-n-pentyl, 1-methyl-n-hexyl radical or a 2-methyl-n-butyl, 2-methyl-n-pentyl, 2-methyl-n-hexyl, 2-ethyl-n-pentyl radical, or a 3-methyl-n-pentyl radical, or other alkyl radicals having 4 to 8 carbon atoms. Those compounds having alkyl radicals R′ with 4 carbon atoms have proved to be superior in their activity to the other alkyl radicals having between 5 and 8 carbon atoms.

The radical X in the hereinbefore given formula may also be an 1,2-propylene, 1,4-butylene, 1,3-butylene, 1,2-butylene and other alkylene radicals.

The substituents $R_1$ and $R_2$ may not only be methyl and ethyl radicals, or together with the nitrogen atom a piperidine or a pyrrolidine radical, but also methyl piperidine, piperazine, morpholine and the like heterocyclic radicals, or n-propyl, isopropyl, n-butyl, isobutyl, allyl and other lower alkyl radicals.

The quaternary ammonium compounds of basic esters of α-alkyl phenyl acetic acids obtained according to the above given examples are prepared, for instance, as follows:

EXAMPLE 11

α-1-methyl-n-propyl phenyl acetic acid-β-diethylamino ethyl ester iodo methylate

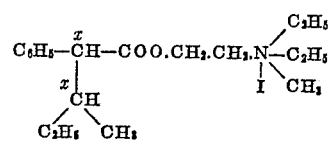

2.91 g. of α-1-methyl-n-propyl phenyl acetic acid-2-diethylamino ethyl ester are dissolved in 35 cc. of benzene or acetic acid ethyl ester. 14.3 g. of methyl iodide are added to said solution and the reaction mixture is heated to 60° C. for 1 hour. Thereafter, the solvent is evaporated in a vacuum, the residue is dissolved in acetone, and ether is added to said acetone solution. Thereby the iodo methylate precipitates. On dissolving said crude product in acetone and reprecipitating with ether, an iodo methylate is obtained which melts at 101–103° C. The compound is readily soluble in water. The same result is obtained by working without a solvent and allowing methyl iodide to directly react at room temperature with the ester.

EXAMPLE 12

α-1-methyl-n-propyl phenyl acetic acid-β-diethylamino ethyl ester bromo methylate

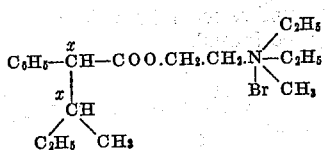

3.5 g. of α-1-methyl-n-propyl phenyl acetic acid-β-diethylamino ethyl ester are dissolved in 30 cc. of ether. The solution is cooled with ice water and methyl bromide is passed thereinto. Thereby, the corresponding bromo methylate precipitates. Its melting point, after dissolving in acetone and reprecipitating with ether, is 118–120° C. The compound is readily soluble in water.

EXAMPLE 13

α-1-methyl-n-propyl phenyl acetic acid-β-diethylamino ethyl ester bromo ethylate

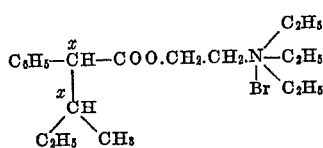

3.15 g. of α-1-methyl-n-propyl phenyl acetic acid-β-diethylamino ethyl ester and 8.2 cc. of ethyl bromide are heated in a pressure resistant, sealed, heavy walled glass tube at 100° C. for 20 hours. After cooling, the crystallized content of said glass tube is dissolved in a small volume of acetone. The solution is decolorized by the addition of animal charcoal and the readily water soluble bromo ethylate is precipitated by the addition of anhydrous ether. The compound has a melting point of 143–144° C.

The following and other quaternary ammonium compounds of basic esters of α-alkyl phenyl acetic acids according to the present invention are produced by using methyl bromide, methyl iodide, isobutyl bromide, and other lower alkyl chlorides, bromides or iodides, dimethyl sulfate, diethyl sulfate, p-toluene sulfonic acid alkyl esters, benzyl halogenides, cyclohexyl halogenides, cyclopentyl halogenides, and others as quaternizing agents and proceeding in about the same manner as described in the foregoing Examples 11 to 13. The resulting quaternary ammonium compounds correspond to the following formula, $$\left[ C_6H_5 - \overset{x}{C}H - COO.X.N\overset{R_1}{\underset{R_3}{-R_2}} \right]^+ .A^-$$
$$\quad\quad R'$$

wherein $R'$ is an alkyl radical having 4 to 8 carbon atoms and an asymmetric carbon atom, X is a lower alkylene radical or a lower alkylene oxyalkylene radical, $R_1$ and $R_2$ are lower alkyl radicals or, together with the nitrogen atom a five- or six-membered heterocyclic radical, $R_3$ a lower alkyl, benzyl, cyclopentyl, cyclohexyl radical, and A an anionic radical, such as a halogen anion, the alkyl sulfate anion, the p-toluene sulfonic acid anion, and other anions as they are employed in the preparation of quarternary ammonium compounds.

The following table gives the melting points of some of the quaternary ammonium compounds obtainable according to the present invention.

| Example No. | R' | X | $R_1$ and $R_2$ together with N | $R_3$ | A | Melting point, °C. |
|---|---|---|---|---|---|---|
| 14 | $CH_3.CH_2.\overset{x}{C}H.CH_3$ | $-CH_2.CH_2-$ | $N-\overset{CH_3}{\underset{CH_3}{\Big\langle}}$ | $CH_3$ | I | 102–106 |
| | α-1-Methyl-n-propyl phenyl acetic acid dimethylamino ethyl ester iodo methylate | | | | | |
| 15 | $CH_3.CH_2.\overset{x}{C}H.CH_3$ | $-CH_2.CH_2-$ | $-N\overset{CH_3}{\underset{CH_3}{\Big\langle}}$ | $CH_3$ | Br | 112–116 |
| | α-1-Methyl-n-propyl phenyl acetic acid dimethylamino ethyl ester bromo methylate | | | | | |
| 16 | $CH_3.CH_2.\overset{x}{C}H.CH_3$ | $-CH_2.CH_2-$ | $-N\overset{C_2H_5}{\underset{C_2H_5}{\Big\langle}}$ | iso—$C_4H_9$ | Br | 84–87 |
| | α-1-Methyl-n-propyl phenyl acetic acid diethylamino ethyl ester bromo isobutylate | | | | | |
| 17 | $CH_3.CH_2.\overset{x}{C}H.CH_3$ | $-CH_2.CH_2-$ | $-N\overset{CH_2-CH_2}{\underset{CH_2-CH_2}{\Big\langle}}CH_2$ | $CH_3$ | Br | 129–131 |
| | α-1-Methyl-n-propyl phenyl acetic acid-N-piperidino ethyl ester bromo methylate | | | | | |
| 18 | $CH_3.CH_2.\overset{x}{C}H.CH_3$ | $-CH_2.CH_2.CH_2-$ | $-N\overset{CH_2-CH_2}{\underset{CH_2-CH_2}{\Big\langle}}CH_2$ | $CH_3$ | Br | 127–129 |
| | α-1-Methyl-n-propyl phenyl acetic acid-N-piperidino-n-propyl ester bromo methylate | | | | | |

Of course, many changes and variations in the composition of the new basic esters and their quaternary ammonium compounds, in the methods of producing said compounds, in the reaction conditions, reaction temperature and duration, the solvents used, the methods of working up the reaction mixtures and of isolating and purifying the reaction products, and the like may be made by those skilled in the art in accordance with the principles set forth herein and in the claims annexed hereto.

As stated above, the new basic esters and their acid addition products and quaternary ammonium compounds are excellent spasmolytic agents of surprisingly high solubility in water, low toxicity, good compatibility to human tissue, high spasmolytic activity, and rapid onset of spasmolytic action after administration.

They are dissolved in sterile distilled water or isotonic saline solution, and filled up in ampoules for administration by injection.

The new compounds may also be orally administered in the form of tablets, pills, dragees, or in other solid and shaped form, or in powder form whereby they are preferably enclosed in gelatine capsules. They are preferably not used in their original form but in diluted form, thus, allowing better and more economical use to be made thereof.

When preparing tablets, pills, dragees and the like preparations, the commonly used diluting agents, binders, and the like additions are employed, such as sugar, lactose, talcum, starch, bolus alba, and as binders, pectin, gelatin, gum arabic, methyl cellulose, yeast extract, agar, tragacanth and others.

We claim:

1. α-1-methyl-n-propyl phenyl acetic acid-β-diethyl-amino ethyl ester citrate.

2. α-1-methyl-n-propyl phenyl acetic acid-β-diethyl-amino ethyl ester.

3. α-1-methyl-n-propyl phenyl acetic acid-β-diethyl-amino ethyl ester methobromide.

4. The quaternary lower alkobromide compounds of the α-1-methyl-n-propyl phenyl acetic acid-β-di-lower alkylamino ethyl ester of the formula

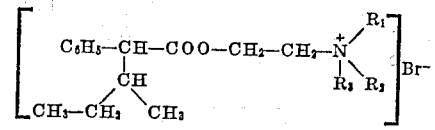

in which $R_1$ and $R_2$ are members selected from the group consisting of the methyl radical and the ethyl radical and $R_3$ is a lower alkyl radical.

5. A compound selected from the group consisting of esters having the formula

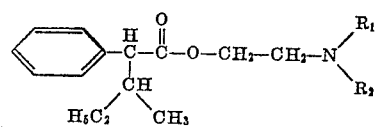

wherein $R_1$ and $R_2$ are lower alkyl and the therapeutically useful acid addition salts and lower alkyl quaternary ammonium salts thereof.

6. The therapeutically useful acid addition salts of the α-1-methyl-n-propyl phenyl acetic acid-β-diethylamino ethyl ester.

References Cited in the file of this patent

UNITED STATES PATENTS 2,655,511    Woodruff            Oct. 13, 1953